United States Patent Office 3,425,507
Patented Feb. 4, 1969

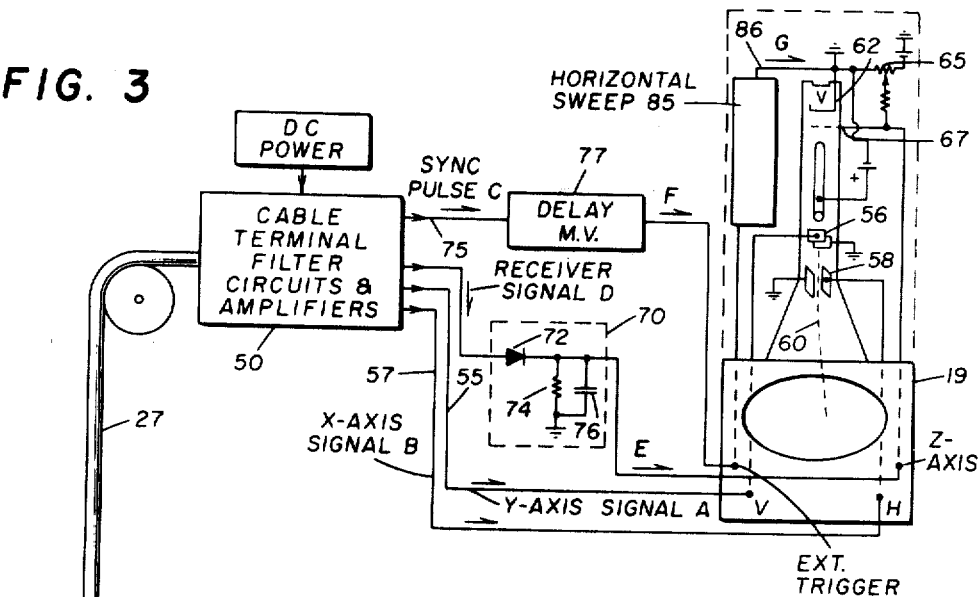
FIG. 3
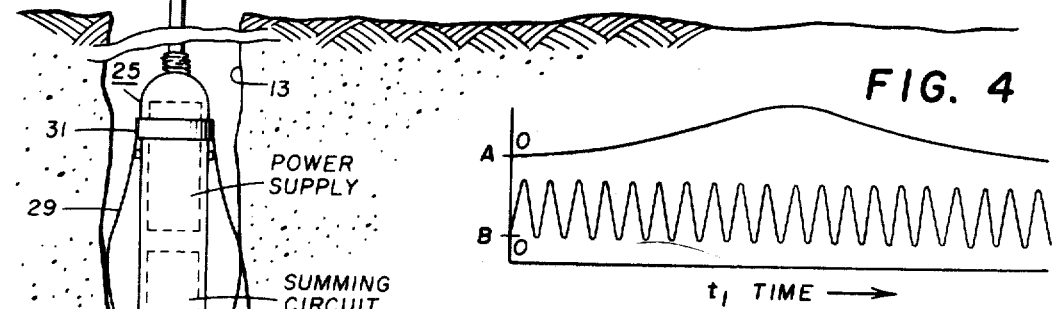
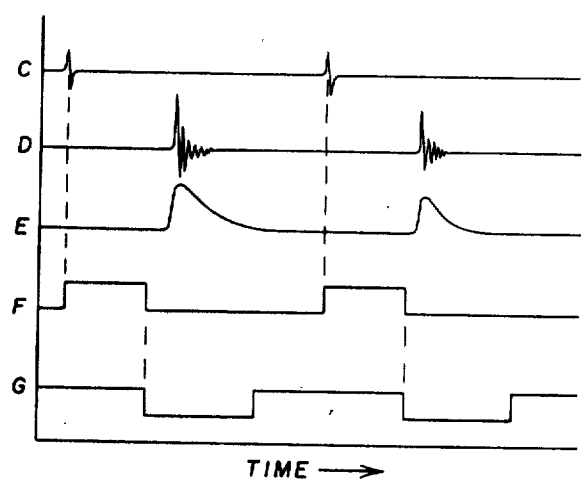
FIG. 4
FIG. 5

3,425,507
SONIC SYSTEM FOR LOCATING OBJECTS IN THE BOTTOM OF A BOREHOLE
Richard L. Caldwell and Joseph Zemanek, Jr., Dallas, Tex., assignors to Mobil Oil Corporation, a corporation of New York
Filed Dec. 22, 1966, Ser. No. 604,030
U.S. Cl. 181—.5　　　　　　　　　　　　　　7 Claims
Int. Cl. G01v 1/28, 1/38

ABSTRACT OF THE DISCLOSURE

The specification discloses a method and apparatus for obtaining a visual representation of submerged objects such as junk in the bottom of an earth borehole. Preferably, a narrow beam of repetitive sonic pulses with a peak frequency of about one megacycle per second is directed toward the submerged object in a zigzag scanning raster. Sonic reflections from the submerged object are detected and are utilized to intensity modulate the electron beam of an oscilloscope which is deflected in a scanning raster related to that of the sonic beam. Thus, there is produced on the face of the oscilloscope an intensity modulated display of the submerged object.

Background of the invention

This invention relates generally to the telecommunication of a facsimile of a remote object by use of sonic waves as the scanning energy. Specifically, it relates to a method and apparatus for producing a visual representation of a submerged object, such as junk in the bottom of an earth borehole.

In the drilling of oil wells, sometimes objects, such as broken off pieces of steel casing or accidentally dropped mechanical tools, fall to the bottom of a borehole and prevent the downward penetration of the drilling bit. In hard rock formations, the drilling bit may even lose a chip off of one of the cones or lose the cone entirely from the bit body. If the object or junk in the bottom of the borehole is sufficiently large and hard enough, the entire drilling operation must be shut down while some means is found for fishing out the junk.

One prior art technique of locating the position of the junk is by means of an impressionable material lowered to the bottom of the borehole. Commonly, a piece of lead is placed on the bottom of a drill string and lowered into the borehole until an impression is received in the lead from the junk. By study of the impressions in the lead at the surface, the drillers sometimes get an indication as to the position and nature of the junk. Often, however, the "lead" method is unreliable and repeated attempts are required to get new lead impressions. The exact orientation and position of the junk are usually required to allow grasping the junk with fishing tools and the like.

Summary of the invention

It is an object of this invention to provide an accurate method and apparatus for defining the exact position and orientation of junk or any other objects located in a remote location such as in the bottom of a borehole.

Therefore, in accordance with a broad aspect of our invention, a beam of repetitive sonic energy pulses is directed downward in a borehole toward junk located at the bottom thereof in a predetermined scanning motion. Then, reflections are received from the sonic pulses rebounding from the bottom of the borehole and from the junk. To produce an indication of the position and orientation of the junk, a recording beam of energy is swept across a recording medium with a motion related to the predetermined scanning motion and the recording beam is intensity modulated with signals representative of the received reflections.

In another aspect of our invention, there is provided a system for carrying out the above method. A transducer assembly, including a transmitter, generates a beam of repetitive sonic pulses and directs it downwardly toward the junk in a borehole. A receiver in the transducer assembly detects reflected sonic pulses from the junk. A scanning means moves the transducer assembly in a predetermined scanning motion. A position means produces a function representative of the position of the transducer assembly in its predetermined scanning motion. A display device, which may include electrostatic deflection plates, is responsive to the position function for sweeping an electron beam across a display medium in accordance with the predetermined scanning motion of the transducer assembly. The display device includes means for intensity modulating the electron beam with the output of the receiver so that the display medium has produced thereon an indication of the configuration of and the objects contained in the bottom of the borehole.

In a still more specific aspect of the invention, the scanning means oscillates the transducer assembly along two orthogonal coordinate axes in a raster motion.

Brief description of the drawings

In the drawings where like reference characters indicate like elements:

FIGURE 3 illustrates a system for carrying out the method of our invention;

FIGURE 4 illustrates the output waveforms of the two downhole potentiometers of FIGURE 3 coupled to the transducer assembly for giving the X and Y coordinate positions of the transducer assembly;

FIGURE 5 illustrates the waveforms at the indicated points in the uphole circuitry of FIGURE 3;

Detailed description of the invention

Figure 1:
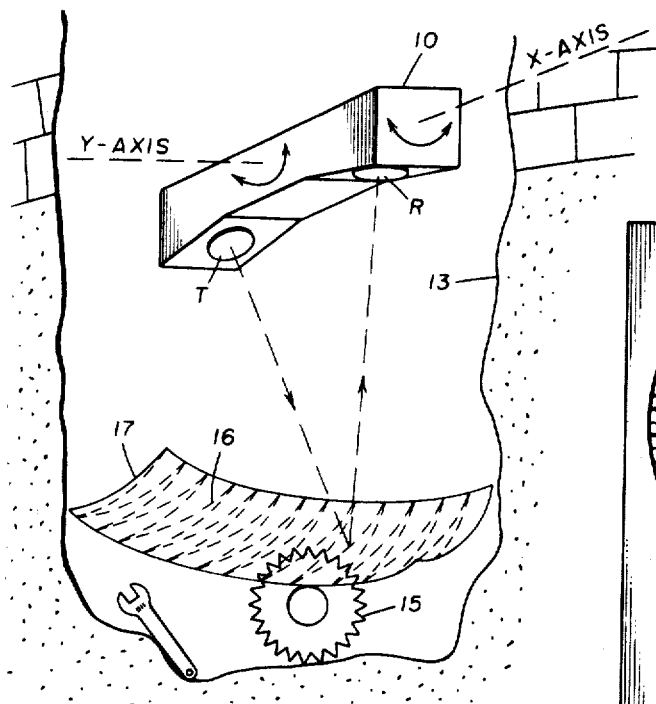
FIGURE 1 illustrates the method of directing a beam of energy in a predetermined scanning motion toward the bottom of a borehole.

Referring now to FIGURE 1, the method of our invention is performed with a transducer assembly 10 positioned in a borehole 13. The transducer assembly 10 includes a transmitting crystal T and a receiving crystal R. The transmitting crystal T generates a pencil-like beam of repetitive sonic pulses, preferably of about one megacycle per second peak frequency and directs it toward the bottom of the borehole where the pulses are reflected from junk and the like, for example, drill bit cone 15, back up to the receiving crystal R. The transmitting crystal T and the receiving crystal R are so positioned relative to one another that reflections are received only from objects within a certain range or depth of field from the transducer assembly 10. It will be apparent, however, that in another embodiment of the invention the depth of field may be greatly increased by the use of a single crystal that functions as both transmitter and receiver.

As the transmitting crystal T continuously emits pulses of sonic energy, the transducer assembly 10 is moved in a predetermined scanning motion across the area of the bottom of the borehole 13. Preferably, the predetermined scanning motion is a zigzag pattern or raster. To produce this type of raster, the transducer assembly 10 is oscillated about its longitudinal axis, hereinafter referred to as the X axis, and at the same time the transducer assembly 10 is oscillated more slowly about an orthogonal axis, hereinafter referred to as the Y axis. As the transducer assembly 10 is oscillated about the two aforementioned axes, a zigzag scanning raster 16 is produced across the area of the bottom of the borehole 13 where the locus of exact focus of the sonic beam is in the form of an arcuate trough 17.

Even though the beam of transmitted and reflected sonic energy is focused primarily at arcuate trough 17, the depth of field of the transmitter T and the receiver R may be several inches above and below the trough 17. Furthermore, vertical movement of the transducer assembly can bring any objects into this depth of field. In one embodiment, the transmitter T and the receiver R are focused at a distance of 12 inches from the center of each crystal and the angle between the transmitted beam and the reflected beam is about 6 degrees. Therefore, objects within about 2 inches above and below the sheet of focus 17 will return reflections to receiving crystal R.

Figure 2:
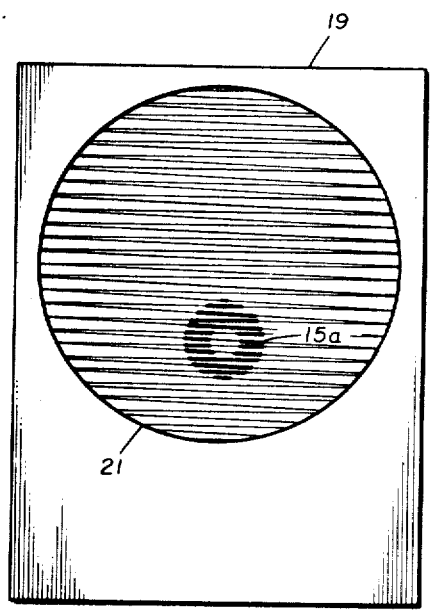
FIGURE 2 illustrates the method of sweeping an energy beam across a recording medium, such as the face of an oscilloscope.

As the transducer assembly oscillates about the X and Y axes and the transmitting crystal T continues to emit sonic pulses, a recording beam of energy is swept across a recording medium, such as the face of oscilloscope 19 of FIGURE 2. The electron beam of the oscilloscope 19 is swept across the face 21 with a scanning motion related to the scanning motion of the transducer 10. More particularly, the electron beam of the oscilloscope 19 is swept from side to side across the face 21 of the oscilloscope in proportion to movement of the tranducer assembly 10 about the X axis. More slowly, the electron beam is moved vertically down the face 21 in proportion to motion of the transducer assembly 10 about the Y axis.

As the electron beam of the oscilloscope 19 is swept in its scanning motion, the beam is intensity modulated by signals representative of the reflections received at receiving crystal R. The intensity control of the oscilloscope 19 is turned down so that normally there is no persistence spot visible on the face 21 except in the presence of a reflection signal. Objects within the depth or field of transducer assembly 10 return reflections to the receiving crystal R, and these reflections intensity modulate the electron beam as it is swept across the face of the oscilloscope 19. Therefore, objects, such as the bit cone 15, appear as an image 15a. Differences in the reflectivity coefficient between objects and the bottom of the borehole cause differences in the strength of echo pulses and therefore the density contrasts on the oscilloscope.

With the exact nature of the junk in the borehole determined as well as the orientation in the bottom of the borehole, appropriate steps may be taken to grasp the object with the use of fishing tools.

Now that the method of our invention has been described in detail, there will be described a system for carrying out the method of our invention with reference to FIGURE 3. After the shutdown of a drilling operation due to the presence of junk in the borehole, a logging tool 25 is lowered into borehole 13 by cable 27. Bow springs 29 and 30 maintain the logging tool 25 in a central position. Collars 31 and 32 of spring 29 and collars 33 and 34 of spring 30 slide freely along the logging tool as it moves in the borehole.

The lower end of logging tool 25 is shown diagrammatically as containing a potentiometer 37 whose movable contact is mechanically attached to the transducer assembly 10. The potentiometer 37 produces an output signal at its movable contact which is proportional to oscillation of the transducer assembly 10 about the X axis. The scanning means for moving the transducer assembly 10 will be described in detail later. Another potentiometer 39 has its movable contact mechanically attached to the transducer assembly 10 so that the output signal appearing at its movable contact is proportional to the oscillation of the transducer assembly 10 about the Y axis.

As mentioned above, the transducer assembly 10 is moved in a zigzag scanning motion in a preferred embodiment. In this embodiment, the output signal from the Y axis potentiometer is waveform A of FIGURE 4, and the output signal of the X axis potentiometer 39 is waveform B. The time scale of FIGURE 4 is such that the waveforms A and B are shown for two complete scans of the area of the bottom of borehole 13. That is, waveform A rises approximately linearly to time $t_1$ when the transducer assemby has moved once across the bottom of the borehole along the Y axis. Waveform B oscillates much more rapidly as the transducer assembly is oscillated about the X axis.

In the operation of the system, a pulser unit 42 excites the transmitting crystal T with an electrical pulse, at the same time transmitting a sync pulse C (FIGURE 5) to the surface equipment by way of logging cable 27. The transmitting crystal T is driven to resonance to produce a sharp acoustical pulse with preferably a peak frequency of about one megacycle per second. The pulse may be reflected from an object 44 and received at receiving crystal R where it is converted into a representative electrical signal and amplified in amplifier 46. The receiver signal may be similar to the one shown as waveform D of FIGURE 5. The receiver signal is applied from the output of amplifier 46 to a summing circuit 48 where it may be superimposed with other signals on the conductors within logging cable 27 as well known to those skilled in the art. At the surface, the receiver signal D is amplified and separated from other signals on the conductors of cable 27 by unit 50. The sync pulses C, as well as the signals A and B of the potentiometers 39 and 37, respectively, are also applied uphole via cable 27 to unit 50. The slowly varying Y axis signal A is applied via conductor 55 to the vertical deflection plates 56 of oscilloscope 19. The X axis signal B is applied via conductor 57 to the horizontal plates 58. Therefore, the electron beam 60 emitted from the cathode 62 is swept across the face of the oscilloscope 19 with a motion proportional to the scanning motion of transducer assembly 10. Potentiometer 65 is adjusted so that no trace is visible on the face of the scope except in the presence of a signal of predetermined upper level being applied to the control grid 67.

The receiver signal D is applied to the Z-axis or sensitivity input of the oscilloscope 19 to intensity modulate the electron beam 60. First, however, it is desirable to detect the receiver signal D in detector 70 comprised of a diode 72 in series with a parallel connected resistor 74 and capacitor 76 connected from the cathode of diode 72 to ground. The output of detector 70 gives a smoothed and rectified receiver signal looking similar to waveform E (FIGURE 5). The reciver signal with waveform E is applied to the Z-axis input of the oscilloscope 19 and thence to the control grid 67 to cause a burst of electrons to be emitted by cathode 62 due to the increased positive potential on control grid 67. Therefore, as the electron beam 60 is swept across the face of the oscilloscope 19, there is produced a spot of light corresponding with each reflection signal received at crystal R.

To prevent modulation of the electron beam 60 by spurious signals or noise, the sync pulse C appearing on conductor 75 triggers circuitry to presensitize the oscilloscope 19 during the expected arrival time of the receiver signal D. More particularly, the sync pulses C trigger a monostable multivibrator 77 to produce an output waveform F (FIGURE 5) during its unstable state. The output waveform F is applied to the external trigger input of the oscilloscope 19. When the trailing edge of waveform F goes negative, the horizontal sweep time-base circuit 85 is triggered to remove positive potential from cathode 62 as indicated by waveform G (FIGURE 5). At all other times except during the unstable state of horizontal sweep circuit 85, the cathode 62 is biased positively by voltage appearing on conductor 86 from the output of the horizontal sweep circuit 85.

Now, as the electron beam 60 is swept across the scope face 21 by potentiometer signals A and B in the zigzag scanning raster proportional to the movement of transducer assembly 10, the received signals at crystal R initiate circuitry to effect the intensity modulation of the electron beam 60 so that there is produced a picture on the face of oscilloscope 19 indicative of junk in the bottom of borehole 13.

To provide a permanent record of the picture of the junk at the bottom of borehole 13, a self-developing camera, such as one available from the Polaroid Corporation, may be coupled to the face of oscilloscope 19.

An oscilloscope suitable for use as oscilloscope 19 is the Tektronix oscilloscope No. 535A available from the Tektronix Corporation, Portland, Oreg. For use in the invention, the oscilloscope must be modified slightly so that the horizontal sweep circuit 85 presensitizes the electron beam when triggered by the sync pulses C appearing at the external trigger input, but does not apply horizontal sweep voltage to the horizontal deflection plates. A circuit suitable for use as the monostable multivibrator 77 is the one described in a book entitled "Transistor Circuit Design," McGraw-Hill Book Company, Inc., 1963, at pages 380–381.

When an oscilloscope has been illustrated with electrostatic deflection plates, it will be readily apparent that magnetic deflection plates may also be used. In fact, any display device can be used wherein a deflectable beam of energy can be swept across a recording medium.

Figure 6:
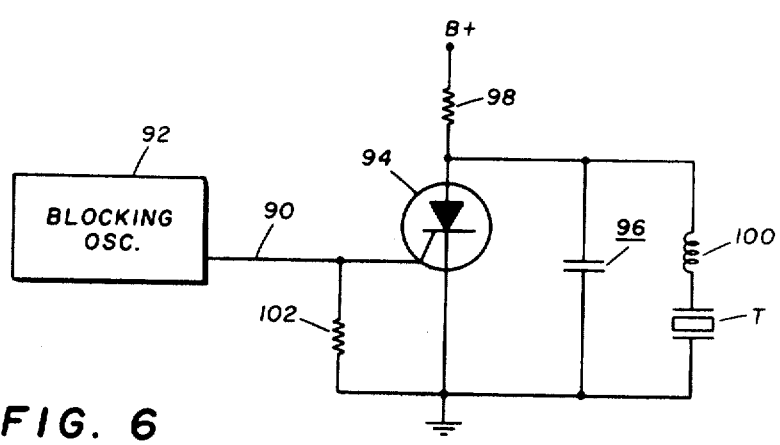
FIGURE 6 illustrates a pulser circuit suitable for use as the pulser of FIGURE 3.

For a circuit suitable for use as the pulser 42 of FIGURE 3, refer now to FIGURE 6. Therein is shown the transmitting crystal T connected in the circuit of a solid-state electronic switch which is closed to excite transmitter T at a pulse repetition rate determined by pulses appearing on the input line 90 from an oscillator 92 which may be a blocking oscillator. More specifically, in the absence of a positive input pulse on conductor 90, a silicon controlled rectifier (SCR) 94 is nonconductive since it is without positive bias. A capacitor 96 and transmitting crystal T charge to B+ voltage through resistor 98. When a positive pulse from blocking oscillator 92 is applied to the SCR 94, the SCR 94 conducts and capacitor 96 and crystal T are discharged therethrough. Crystal T resonates to produce an acoustic pulse, preferably of about one megacycle per second. An inductor 100 provides optimum coupling between capacitor 96 and crystal T. For use in our invention, the oscillator 92 may suitably have a pulse repetition frequency of about one kilocycle per second.

In one embodiment, the pulser circuit of FIGURE 6 may include the following component values:

| | |
|---|---|
| B+ | 200 volts. |
| SCR 94 | 2N1599 type. |
| Resistor 98 | 100K ohms. |
| Resistor 102 | 5K ohms. |
| Capacitor 96 | .0015 microfarad. |
| Inductor 100 | 2 microhenries. |

Figure 7:
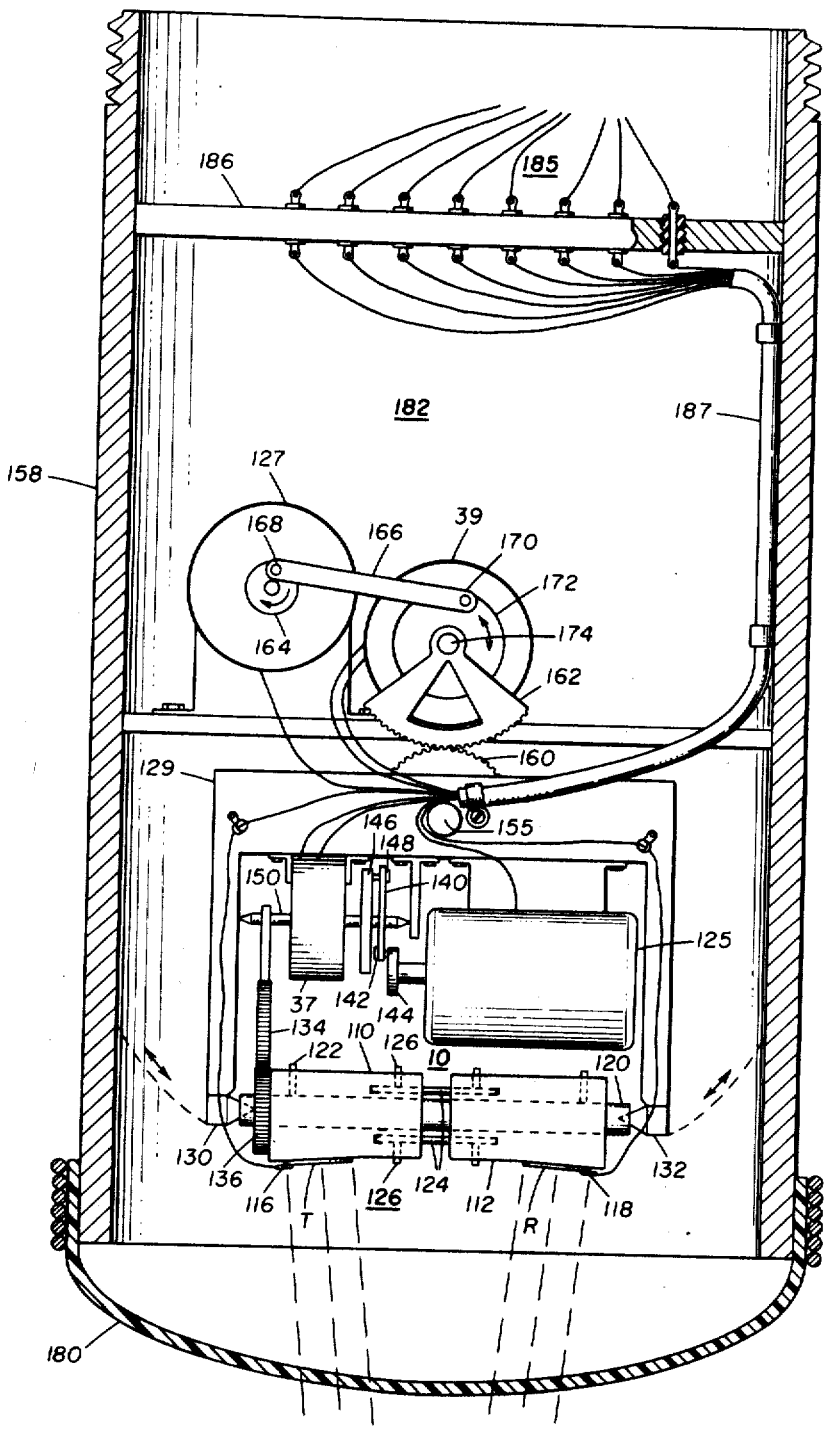
FIGURE 7 illustrates in more detail the construction of the transducer assembly and the scanning means of FIGURE 3.

For a more detailed description of the transducer assembly 10 and a scanning means, refer now to FIGURE 7.

The transducer assembly 10 is conveniently composed of two separate blocks 110 and 112 of a material, such as aluminum or lead, whose acoustic impedance matches that of the transducer crystals T and R. Block 110 has mounted on the underneath face thereof the transmitting crystal T. The transmitting crystal T may suitably be constructed of $PbZrTiO_3$ (PZT), which is available from the Clevite Corporation. Crystal T may be a disc of about one inch diameter and 0.10 inch thickness.

The receiving crystal R may be of similar construction to the transmitting crystal T, and both may be attached to the blocks 110 and 112 by any high temperature cement. Contacts 116 and 118 may be attached to the faces of crystals T and R by silver-lead alloy solder. Then, the entire faces of crystals T and R may be coated with an epoxy resin.

The blocks 110 and 112 are mounted on a rod 120 passing centrally therethrough and fixed by set screws 122. To allow for changing the focusing distance of the sonic beams of crystals T and R, the blocks 110 and 112 may be attached to one another by means of connecting pins 124 secured by set screws 126. If it is desired to reduce the focus distance of the transducer assembly, the two blocks 110 and 112 may be moved closer together.

The sonic beam of repetitive pulses emerging from the face of crystal T will, of course, be about one inch in diameter. Where, however, the crystals T and R are focused for about 12 inches away, the diameter of the transmitted beam at this distance will be about .92 inch at the edges of half-power levels in a mud-filled borehole. Where finer resolution than 2.5 inches is required, shorter focal lengths may be used.

Now there will be described the scanning means for oscillating the transducer assembly 10 about the X and Y axes. Briefly, electric motor 125 effects the oscillation of the transducer assembly 10 about rod 120 to produce motion along the X axis, as mentioned above. Also, motor 127 effects the oscillation of U-shaped member 129 to give motion to the transducer assembly 10 along the Y axis.

More specifically, the rod 120 is mounted on either end by pins 130 and 132. The spur gear section 134, meshing with gear 136, oscillates the rod 120 on the pins 130 and 132. The spur gear 134 is oscillated as follows. A lever 140 freely pinned at 142 at the outer edge of a small wheel 144 attached to the armature of motor 125 oscillates a large wheel 146 where lever 140 is freely pinned at 148. As wheel 144 rotates, the pin 142 makes complete revolutions, but the pin 148 only oscillates back and forth due to its long lever arm to the center of wheel 146. As wheel 146 oscillates, it transmits motion to a connected shaft 150 freely pinned at either end. The spur gear section 134 fixedly attached to shaft 150 then oscillates to cause the oscillation of the transducer assembly 10 about the X axis.

The oscillation of the U-shaped member 129 is performed by the following mechanism. The U-shaped member 129 is fixedly attached to a rod 155 which extends out of the plane of FIGURE 7. Rod 155 rolls freely on bearings which are located at its ends and are fixed to the housing 158. A spur gear 160 is attached to rod 155 and meshes with the spur gear section 162. Rotation of a small wheel 164 attached to the armature of motor 127 causes the end of lever 166 pinned at 168 to rotate. However, the other end of lever 166 pinned at 170 on large wheel 172 only oscillates back and forth. As wheel 172 oscillates, it transmits oscillating motion to shaft 174 and thence to spur gear section 162.

To provide a signal proportional to the rotational position of transducer assembly 10 about the X axis, the potentiometer 37 is provided. Shaft 150 passes through potentiometer 37 and moves the internal movable contact in proportion to the movement of transducer assembly 10. Similarly, the Y axis potentiometer 39 is mounted on the same shaft 174 as the spur gear 162.

The tubular outer housing 158 extends downward beyond the transducer assembly 10 to prevent damage of the transducer assembly by protruding objects. The bottom of the tubular housing 158 may be covered with a cup-shaped boot 180 made of a flexible material such as neoprene and attached to the housing 158 with bands of wire soldered together.

To prevent a pressure drop across the boot 180, the entire cavity 182 is filled with a light oil. Input power and output signals pass into and out of cavity 182 through feedthrough terminals 185 screwed into bulkhead 186. The terminals 185 are, of course, electrically insulated from the bulkhead 186. Signals pass through the feedthrough terminals 185 and cable 187 to the various electrical components in the scanning mechanism.

It will be readily apparent that there may be certain modifications to our invention. For instance, there may be display devices used other than a cathode-ray oscilloscope. An electrically sensitive paper recorder using paper, such as Teledeltos paper available from Gubelman Charts Division of Nashua Corporation, Newark, N.J., may be used. In this type of recorder, a recording beam of energy, such as the electrons in a wire, may be swept across a paper recording surface. In the presence of an echo pulse, a beam of electric current burns or otherwise sensitizes the paper recording medium. Furthermore, while separate transmitting and receiving crystals have been illustrated, it will be readily apparent that a single crystal may be used for both functions with suitable switching circuitry, such as a T-R switch well known in the radar art.

While our invention has been described with reference to the location of junk in the bottom of a borehole, it has other applications. For example, our invention may be used in undersea mining to search for diamonds or magnesium nodules. In such case, the scanning assembly may be suspended below the bottom of a boat containing the display and recording apparatus.

In the light of the foregoing description and illustration of our invention, those skilled in the art may imagine certain other modifications, all still within the true spirit and scope of the invention. It is intended to cover all such modifications as fall within the scope of the appended claims.

The invention claimed is:

1. A method for locating objects in the bottom of a borehole, comprising the steps of:
   (a) lowering an ultrasonic transmitter-receiver into the borehole near the bottom thereof,
   (b) oscillating said ultrasonic transmitter-receiver about a first axis substantially perpendicular to the longitudinal axis of the borehole and simultaneously oscillating said ultrasonic transmitter-receiver about a second axis subsantially perpendicular to said first axis and movable with respect to said borehole axis, whereby said ultrasonic transmitter-receiver may transmit ultrasonic energy in a zigzag scanning raster over the area of the bottom of the borehole,
   (c) sweeping a recording beam of energy across a recording medium in a zigzag scanning raster correlated to the scanning raster of said ultrasonic transmitter-receiver, and
   (d) modulating said recording beam in accordance with signals representative of the energy received by said transmitter-receiver, whereby there may be produced on said recording medium a representation of any objects in the bottom of the borehole.

2. The method defined as in claim 1 wherein step (c) includes sweeping an electron beam across a recording medium.

3. A system for locating objects in the bottom of a borehole, comprising:
   (a) a logging tool adapted to be moved through a borehole, said logging tool having a hollow compartment at the lower end thereof, the lower end of said logging tool being transparent to acoustic radiation,
   (b) a transducer assembly located in the hollow compartment of said logging tool, said transducer assembly including means for transmitting a directional beam of acoustic radiation downwardly toward the bottom of a borehole and including means for receiving reflected acoustic radiation,
   (c) scanning means in said logging tool for oscillating said transducer assembly about a first rotational axis substantially perpendicular to the longitudinal axis of said logging tool and for simultaneously oscillating said transducer about a second rotational axis substantially perpendicular to said first rotational axis and movable with respect to said logging tool axis, whereby the acoustic beam transmitted by said transducer assembly is scanned over the area of the bottom of the borehole in a zigzag scanning raster,
   (d) first function generating means in said logging tool for generating a first function indicative of the orientation of said transducer assembly about said first rotational axis,
   (e) second function generating means in said logging tool for generating a second function indicative of the orientation of said transducer assembly about said second rotational axis,
   (f) a recording device including a recording beam of energy and a recording medium,
   (g) means responsive to said first function for sweeping said recording beam across said recording medium with respect to a first coordinate axis,
   (h) means responsive to said second function for sweeping said recording beam of energy with respect to a second coordinate axis perpendicular to said first coordinate axis whereby said recording beam is swept in a zigzag scanning raster, and
   (i) means for modulating said recording beam with signals representative of the reflections received by said transducer assembly whereby there may be produced on said recording medium a representation of the bottom of the borehole including any objects therein.

4. The system as defined in claim 3 wherein said scanning means comprises:
   (a) a U-shaped member mounted for rotation about said first rotational axis supported by said logging tool, said transducer assembly being mounted in said U-shaped member for rotation about said second rotational axis,
   (b) means mechanically attached to said logging tool for oscillating said U-shaped member about said first rotational axis, and
   (c) means mechanically attached to said U-shaped member for oscillating said transducer assembly about said second rotational axis.

5. The system defined as in claim 4 wherein:
   (a) said first function generating means comprises a first potentiometer having a resistive element and a movable contact element, one of said elements of said first potentiometer being mechanically fixed with respect to said logging tool, the other of said elements of said first potentiometer being arranged to move with respect to the movement of said U-shaped member about said first rotational axis, and
   (b) said second function generating means comprises a second potentiometer having a resistive element and a movable contact element, one of said elements of said second potentiometer being mechanically fixed with respect to said U-shaped member, and the other of said elements of said second potentiometer being arranged to move with respect to the movement of said transducer assembly about said rotational second axis.

6. The system as defined in claim 3 wherein said recording device comprises a cathode ray oscilloscope.

7. The system as defined in claim 3 wherein the lower end of said logging tool comprises a tubular metallic housing and a boot attached to the lower end of said housing, said boot being of a material substantially transparent to acoustic radiation, said housing and said boot defining said hollow compartment, said hollow compartment being filled with a liquid.

References Cited

UNITED STATES PATENTS

| 2,825,044 | 2/1958 | Peterson | 181—0.5 |
| 2,989,864 | 6/1961 | Bamford | 73—67.8 |
| 3,086,390 | 4/1963 | Brown | 73—67.8 |

SAMUEL FEINBERG, *Primary Examiner.*

JAMES FOX, *Assistant Examiner.*

U.S. Cl. X.R.

73—67.8; 340—18